（12）United States Patent
Stoian et al.

(10) Patent No.: US 12,254,668 B1
(45) Date of Patent: Mar. 18, 2025

(54) UNSTRUCTURED OBJECT MATCHING IN IMAGE DATA

(71) Applicant: Amazon Technologies, Inc., Seattle, WA (US)

(72) Inventors: Ioana-Sabina Stoian, Iași (RO); Alin-Ionut Popa, Bucharest (RO); Ionut Catalin Sandu, Bucharest (RO); Daniel Voinea, Vladiceasca (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 438 days.

(21) Appl. No.: 17/708,469

(22) Filed: Mar. 30, 2022

(51) Int. Cl.
*G06V 10/74* (2022.01)
*G06N 3/0455* (2023.01)
*G06N 3/08* (2023.01)
*G06T 7/174* (2017.01)
*G06V 10/26* (2022.01)
*G06V 10/28* (2022.01)
(Continued)

(52) U.S. Cl.
CPC ......... *G06V 10/761* (2022.01); *G06N 3/0455* (2023.01); *G06N 3/08* (2013.01); *G06T 7/174* (2017.01); *G06V 10/26* (2022.01); *G06V 10/28* (2022.01); *G06V 10/34* (2022.01); *G06V 10/443* (2022.01); *G06V 10/751* (2022.01); *G06V 10/7715* (2022.01); *G06V 10/806* (2022.01); *G06V 10/82* (2022.01); *G06T 2207/20036* (2013.01); *G06T 2207/20081* (2013.01); *G06T 2207/30176* (2013.01)

(58) Field of Classification Search
None
See application file for complete search history.

(56) References Cited

U.S. PATENT DOCUMENTS

2020/0222018 A1\* 7/2020 van Walsum .......... A61B 5/349
2022/0058827 A1\* 2/2022 Montserrat ............ G06V 20/64
(Continued)

FOREIGN PATENT DOCUMENTS

CN 109960742 B \* 11/2021 ............... G06T 7/11

OTHER PUBLICATIONS

He, K., et al., Deep residual learning for image recognition, in 2016 IEEE Conference on Computer Vision and Pattern Recognition (CVPR). 2016, IEEE: Las Vegas, NV. p. 770-778. (Year: 2016).\*
(Continued)

*Primary Examiner* — Emily C Terrell
*Assistant Examiner* — Nathan J Bloom
(74) *Attorney, Agent, or Firm* — K&L Gates LLP

(57) ABSTRACT

Devices and techniques are generally described for object matching in image data. In various examples, first image data and second image data may be received. A first feature map representing the first image data and a second feature map representing the second image data may be generated. The first feature map and second feature map may be combined and a first and second segmentation mask may be generated using the combined feature map. The first segmentation mask may be used to filter the first feature map to generate a filtered representation. The second segmentation mask may be used to filter the second feature map to generate a filtered representation. A determination may be made that a first object depicted in the first image data corresponds to a second object depicted in the second image data using the filtered representations.

20 Claims, 9 Drawing Sheets

(51) Int. Cl.
*G06V 10/34* (2022.01)
*G06V 10/44* (2022.01)
*G06V 10/75* (2022.01)
*G06V 10/77* (2022.01)
*G06V 10/80* (2022.01)
*G06V 10/82* (2022.01)

(56) References Cited

U.S. PATENT DOCUMENTS

| | | | |
|---|---|---|---|
| 2022/0101047 A1* | 3/2022 | Puri | G06T 5/30 |
| 2022/0351494 A1* | 11/2022 | Kaneko | G06T 7/00 |
| 2023/0169753 A1* | 6/2023 | Helm | G06V 10/40 |
| | | | 382/103 |

OTHER PUBLICATIONS

Steitz, Jan-Martin O., Faraz Saeedan, and Stefan Roth. "Multi-view x-ray r-cnn." German Conference on Pattern Recognition. Cham: Springer International Publishing, Oct. 2018. (Year: 2018).*

* cited by examiner $$\mathcal{L} = \mathcal{L}_{ce}(S, \tilde{S}) + \mathcal{L}_{seg}(M^A, \tilde{M}^A) + \mathcal{L}_{seg}(M^B, \tilde{M}^B)$$

Algorithm 1 : MATCHER

Input: $R^A \in \mathbb{R}^{P \times d}$ and $R^B \in \mathbb{R}^{Q \times d}$
Output: $\tilde{S} \in \{0, 1\}$ 1. $S \leftarrow \text{cosine-similarity}(R^A, R^B)$
2. $R^{A \cup B} \leftarrow \{S_{ij} \cdot [R_i^A, R_j^B] \mid i = \overline{1..P}, j = \overline{1..Q}\}$
3. $\tilde{R}^{A \cup B} \leftarrow \text{adaptive-pool}(R^{A \cup B})$
4. $\tilde{S} \leftarrow \Phi(\tilde{R}^{A \cup B})$

FIG. 8

UNSTRUCTURED OBJECT MATCHING IN IMAGE DATA

BACKGROUND

Object detection is a computer vision task involving the location and/or classification of an object within an image. Segmentation of image data includes separation of pixels determined to be part of the foreground environment from pixels determined to be part of the background environment. For example, a person standing in the foreground of an image may be segmented from the background environment or an article of clothing being held may be segmented from the person holding the article using segmentation techniques. Segmentation techniques may generate segmentation masks that denote whether each pixel of an image is a part of the "foreground" or the "background." In some cases, convolutional neural networks (CNNs) and/or other machine learning models can be used to encode images. Further, in some cases, CNNs may be used to classify types and/or classes of objects. For example, a CNN may be used to detect and classify objects present in segmented foreground image data and/or background image data corresponding to a class for which the convolutional neural network has been trained.

BRIEF DESCRIPTION OF DRAWINGS

FIG. 8 depicts an example algorithm that may be used to train the unstructured object matching system of FIG. 1, in accordance with an example aspect of the present disclosure.

DETAILED DESCRIPTION

Figure 1:
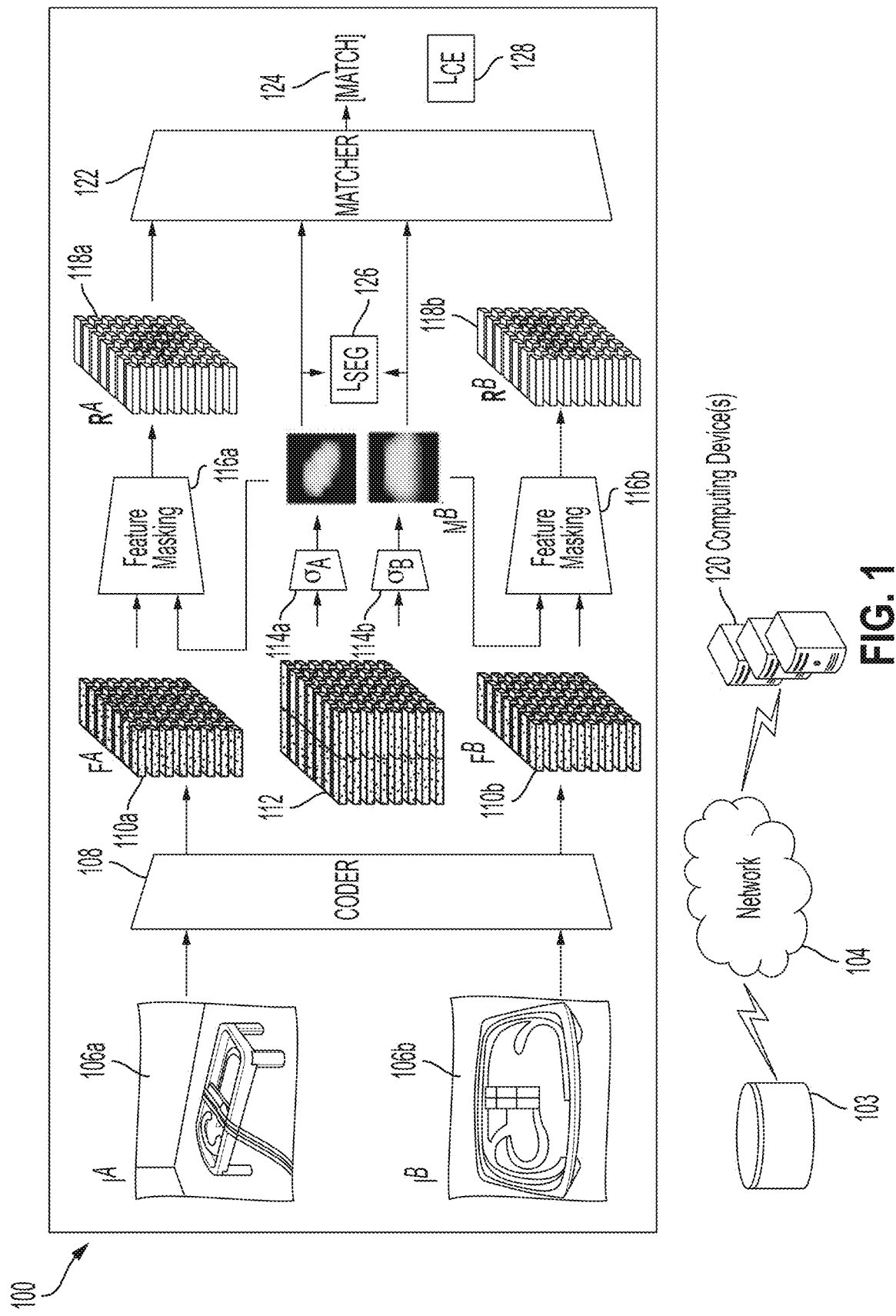
FIG. 1 is a diagram of an example system configured to perform unstructured object matching in image data, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

The computer vision task of object matching generally refers to matching one or more different depictions of objects appearing in a first image with one or more corresponding objects in one or more second images. Unstructured object matching refers to object matching scenarios where the context, appearance, and/or the geometrical integrity of the objects to be matched changes drastically from one image to another (e.g., a pair of pajamas which is folded in one image and which is worn by a person in another image). Traditional approaches like keypoint-based feature matching perform poorly for unstructured object matching due to the high complexity in terms of viewpoint, background variations, and/or the high degrees of freedom in terms of structural configurations. Described herein is an end-to-end deep learning framework comprising a twins-based matching approach leveraging a co-salient region segmentation task and a similarity-based region descriptor pairing technique. The unstructured object matching systems and techniques described herein are able to overcome the limitations of prior keypoint-based object matching systems and are able to match objects between images even when the context, appearance, and/or geometrical integrity of the objects changes significantly from one image to the other.

Determining correspondences between pairs of images is a challenging technical task in the computer vision community. Its impact is directly visible in sub-domains such as optical flow determination, camera calibration, stereo reconstruction, structure from motion, and even human motion understanding. There are a multitude of factors which contribute to the difficulty of such a task. One is the phenomenon of scene-shift where the scene is the same, albeit with a different viewpoint, illumination, set of foreground objects, etc., thus creating context confusion and ambiguity across both images.

The second major challenge which might appear and that is less explored, is when the searched object is unstructured and does not possess a rigid geometry across both images. For example, consider a case where clothing is worn by a person in a first image, and is folded neatly on a clothing rack in a second image. This use-case is often met in compliance check situations or image content search applications. Computer-vision based compliance checks may use unstructured object matching to ensure that prior to making an item available on a specific service, that the item passes all the necessary compliance checks, thus ensuring whether the object depicted in the attached compliance document is the same as the object showcased in the catalogue. However, other use cases may include object detection/matching used in robotics and/or other autonomous vehicles. In various other examples, a visual search use case may involve taking a first image as a query image and generating a ranked-list of images based on object similarity between objects appearing in the ranked list of images and one or more objects in the query image.

Traditionally, the unstructured object matching problem is approached by determining a set of keypoint correspondences across both images which are invariant to all factors enumerated above. However, described herein is an unstructured object matching system that addresses the technical matching problem differently. For example, the object-matching systems and techniques described herein comprise a framework for unstructured object matching, based on segmentation of the potential common regions of interest followed by descriptor pairing using cosine-similarity (or other similarity metrics) for the retrieved regions.

The unstructured object matching systems and techniques described herein provide a number of technical improvements over prior object matching technologies. For example, the various systems and techniques described herein provide a matching algorithm that can localize potential matching regions and can successfully operate on image representations where the searched objects do not possess a rigid geometrical structure. Additionally, in contrast to other co-salient region detection approaches, semantically-similar co-salient regions are determined and inference is performed to determine whether it is the same object or not. The evaluation task for this unstructured object matching uses ground-truth segmentation masks for matching regions. A common image pair embedding is determined for both foreground regions using a co-segmentation task of salient regions. Basically, this recovers the regions with the same semantic meaning, such as the general class of objects. Next, a classifier is used on top of a region descriptor pairing heuristic leveraged by cosine-similarity to decide if the highlighted semantic regions are actually the same objects or not.

Generally, in machine learned models such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm to incrementally adjust the weights to cause the most rapid decrease (or increase) to the output of the loss function. The method of updating the parameters of the machine learning model may be referred to as back propagation.

FIG. 1 is a diagram of an example unstructured object matching system 100 for matching objects in image data, according to various embodiments of the present disclosure. As depicted in FIG. 1, computing device(s) 120 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet.

Given a pair of images ($I^A$, $I^B$) (e.g., images 106a, 106b), where $I^A, I^B \in \mathbb{R}^{w_0 \times h_0 \times 3}$, the goal is to assign a similarity score $\tilde{S} \in \{0, 1\}$ corresponding to the case of matching or non-matching objects within the image pair, respectively. Thus, during training, for each pair of images ($I^A$, $I^B$) there is an attached pair of ground truth figure-ground segmentation masks, $M^A, M^B \in \mathbb{R}^{w \times h}$ and target class label $S \in \{0, 1\}$ corresponding to [MATCH] or [NON-MATCH], respectively.

The first step is to obtain a pair of feature maps 110a, 110b describing the most relevant information from both input images 106a, 106 (e.g., $I^A$ and $I^B$). Additionally, the goal is to build the pair of feature maps 110a, 110b in a co-dependent manner. Feature maps 110a, 110b comprise an array of features, with each feature being a numerical representation of the image data within an area of the input image. In some examples, the features for each portion of the image may result from a convolution operation performed on the pixels of that portion of the image. In some cases, pooling techniques may be used to determine a representative numerical value for the portion of the image on which the convolution is performed. Additionally, in some examples, an activation function may be used to normalize the value (e.g., to a value between 0 and 1 or within some other desired range). Accordingly, each feature of a feature map may represent a portion of the input image and may be arranged spatially such that the feature within the feature map roughly corresponds to the same relative spatial location in the input image (e.g., the top left corner feature in the feature map may correspond to a top left corner region of the input image data).

Coder 108 is a specialized image encoder network trained to generate feature maps 110a, 110b from a pair of input images 106a, 106b. As described in further detail below, the coder 108 comprises convolutional, ReLu, and pooling (e.g., max pooling) blocks that compress the spatial image information in a depth-wise manner (e.g., along a dimension orthogonal to image height h and width w). Each block of coder 108 (e.g., each encoder block) may be denoted as $\psi_i$. The signal from the different images 106a, 106b are combined by the coder 108 between each such encoding block (e.g., blocks 202a, 202b, 204a, 204b, 206a, 206b, etc., of FIG. 2) prior to passing the intermediate data representation to the next such encoding block. Basically, this is a mixed signal strategy, which implicitly constrains the feature maps to be consistent.

$$F_i^A = \begin{cases} \psi_i^A(I^A), & \text{if } i = 1 \\ \psi_i^A(F_{i-1}^A, F_{i-1}^B), & \text{otherwise} \end{cases}$$

After i=4 iterations of information downsampling (or some other number of iterations, according to the desired implementation), the result is $$F^A = F_4^A,$$

where $F^A \in \mathbb{R}^{w \times h \times d}$ with $$w = \frac{w_0}{32}$$

and $$h = \frac{h_0}{32}.$$

In some examples, high-quality results may be obtained with d=512. However, the particular value for d may be modified according to the desired implementation. The operation is similar with respect to $I_B$ and $\psi^A$ obtaining $F_B \in \mathbb{R}^{w \times h \times d}$. Basically, $F^A$ and $F^B$ contain the encoded information of $I^A$ and $I^B$ in a correlated manner. Accordingly, each feature map 110*a*, 110*b* encoded by the coder 108 includes salient information about the objects present in each of the input images 106*a*, 106*b*.

Once feature maps $F^A$ and $F^B$ (e.g., feature maps 110*a*, 110*b* determined using coder 108) are computed, the goal of the unstructured object matching system 100 is to determine the co-salient regions from both images that represent the objects depicted therein. This translates to recovering the potentially common objects. For this purpose, two segmentation heads, $\sigma_A$ and $\sigma_B$ (segmentation heads 114*a*, 114*b*), operating on the concatenated feature map information 112 (e.g., a combined feature map), $F^A \| F^B$, where $\|$ is the concatenation operator defined as $\|$: ($\mathbb{R}^{w \times h \times d}$, $\mathbb{R}^{w \times h \times d}$) → $\mathbb{R}^{w \times h \times 2d}$. The intuition behind using the concatenated feature map information 112 is to learn an implicit correlation between the co-salient regions of both images 106*a*, 106*b* by spatially overlapping the common information. The segmentation heads $\sigma_A$ and $\sigma_B$ (e.g., segmentation heads 114*a*, 114*b*) output two segmentation masks $\tilde{M}^A \in \mathbb{R}^{w \times h}$ and $\tilde{M}^B \in \mathbb{R}^{w \times h}$ corresponding to input images $I^A$ and $I^B$, respectively. The segmentation masks contain foreground and background segmentation masks of the co-salient objects from both input images. The foreground information provided by $M^A$ and $M^B$ is used to mask the irrelevant (background) features from the feature maps 110*a*, 110*b* (e.g., $F^A$ and $F^B$), respectively, at feature masking operations 116*a*, 116*b*, to generate filtered representations $R^A$ and $R^B$ of the respective feature maps 110*a*, 110*b*. The filtered representations $R^A$ and $R^B$ of the feature maps are shown in FIG. 1 as filtered representations of feature maps 118*a*, 118*b*.

$$R^A = \{F_{ij}^A \in \mathbb{R}^d | M_{ij}^A > \alpha, i = \overline{1..w}, j = \overline{1..h}\}$$

$$R^B = \{F_{ij}^B \in \mathbb{R}^d | M_{ij}^B > \alpha, i = \overline{1..w}, j = \overline{1..h}\}$$

In practice, parameter $\alpha$ may be tuned and/or validated. Intuitively, $R^A \in \mathbb{R}^{P \times d}$ and $R^B \in \mathbb{R}^{Q \times d}$ contain the foreground feature information extracted from the feature maps $F^A$ and $F^B$, respectively.

Figure 2:
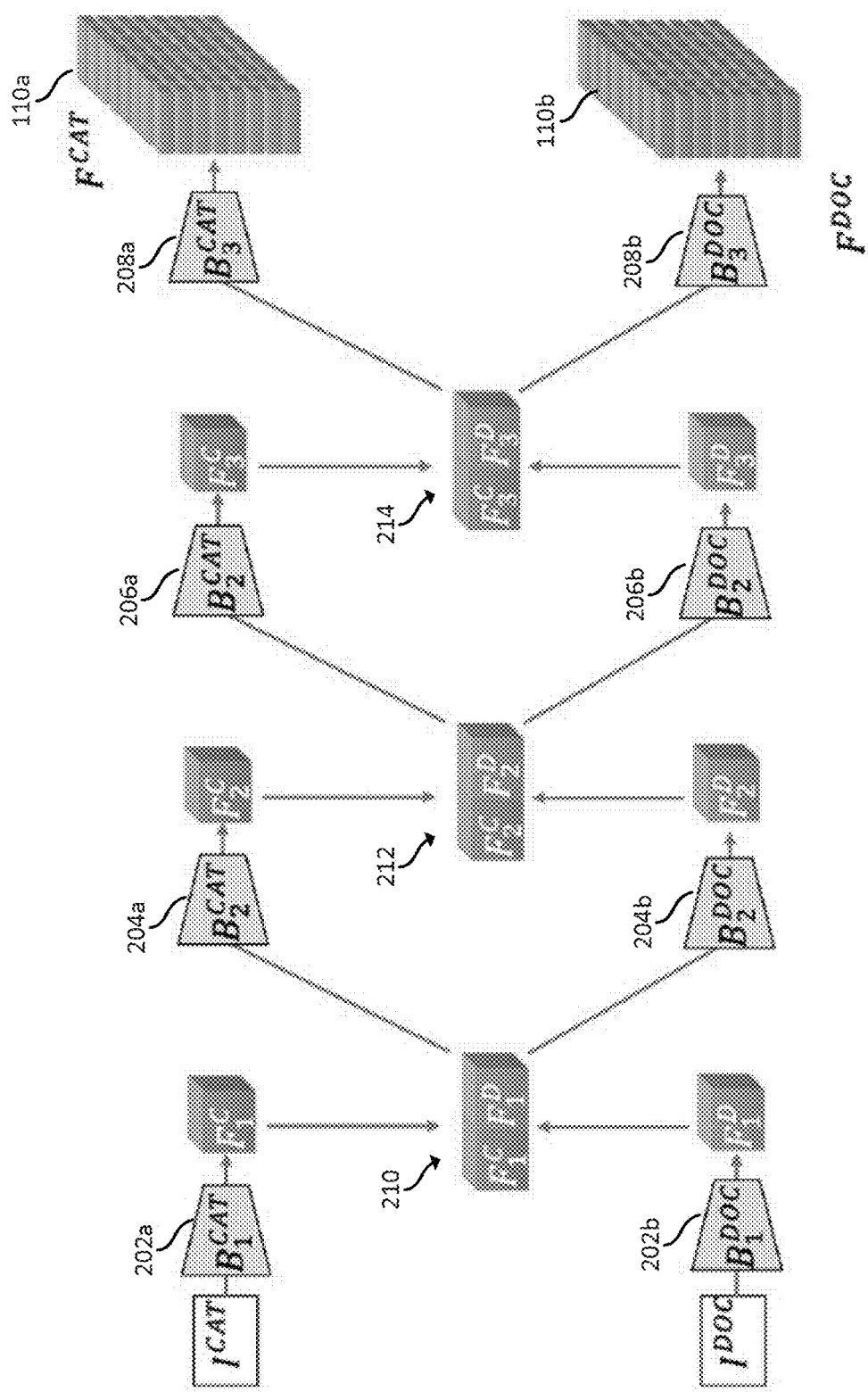
FIG. 2 depicts a coder network that may be used to generate feature maps with co-salient object regions, in accordance with various embodiments of the present disclosure.

FIG. 2 depicts the coder 108 that may be used to generate feature maps with co-salient object regions, in accordance with various embodiments of the present disclosure. The coder 108 may use any number of blocks, such as blocks 202 (comprising block 202*a* and block 202*b*), block 204 (comprising block 204*a* and block 204*b*), block 206 (comprising block 206*a* and block 206*b*), and block 208 (comprising block 208*a* and block 208*b*). More or fewer blocks may be used according to the desired implementation. Each block may include one or more convolutional layers effective to perform a spatial convolution operation, a pooling layer (e.g., max pooling), and an activation layer (e.g., ReLu). Each set of blocks may share weights according to a siamese network architecture. For example, blocks 202*a* and block 202*b* may share weights. Similarly, block 204*a* and block 204*b* may share weights, and so on. The output of each block may comprise a downsampled representation of the input. As shown in FIG. 2, the output of each coder block for a given image may be combined with the output of the corresponding block for the other image. For example, the output of block 202*a* (for image $I^{CAT}$) may be combined with the output of block 202*b* (for image $I^{DOG}$) to generate the combined intermediate representation 210 (e.g., a combined feature representation). The combined intermediate representation 210 may serve as the input to the next layer of blocks 204. Similarly, the output of coder block 204*a* and coder block 204*b* may be combined to generate the combined intermediate representation 212 which may serve as input to the next layer of blocks 206. The output of coder block 206*a* and coder block 206*b* may be combined to generate the combined intermediate representation 214 which may serve as the input to the next layer of blocks 208. In the example depicted in FIG. 2, four layers of blocks (e.g., four iterations) are used. Accordingly, the output of block 208*a* is used as the feature map 110*a* for further processing (as described above in reference to FIG. 1). Similarly, the output of block 208*b* is used as the feature map 110*b* for further processing. It should be noted that different numbers of blocks/iterations may be used according to the desired implementation of the coder 108. By interleaving the outputs of each set of blocks as described above, the coder 108 provides a joint processing backbone that highlights the common descriptors present in each input image.

Figure 3:
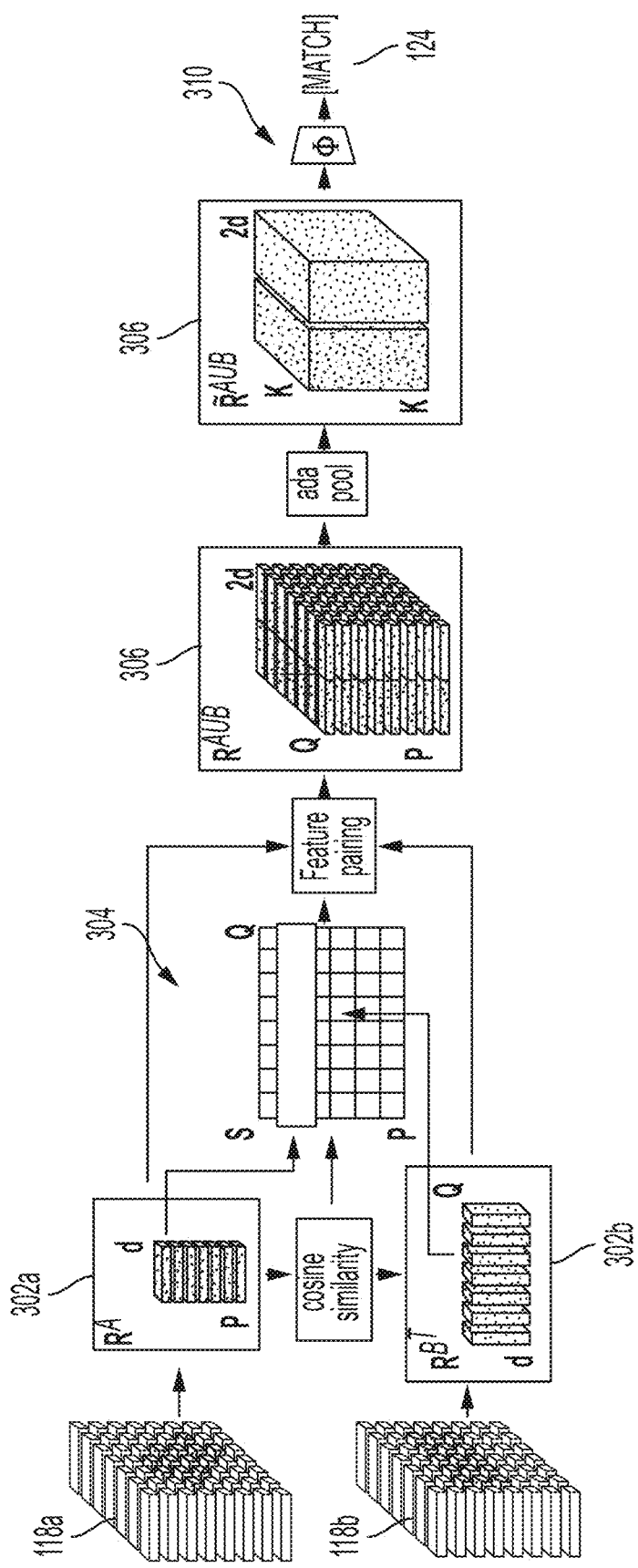
FIG. 3 depicts a matcher component that may be used to match foreground objects represented in image data, in accordance with various aspects of the present disclosure.

FIG. 3 depicts a matcher component (e.g., matcher component 122 of FIG. 1) that may be used to match foreground objects represented in the input image data, in accordance with various aspects of the present disclosure. As previously described in reference to FIG. 1, the filtered representations of the feature maps 118*a*, 118*b* are input into the matcher component 122. The filtered representations of the feature maps 118*a*, 118*b* are referred to herein as co-salient descriptors $R^A$ and $R^B$ as these filtered feature maps represent the co-salient regions of the input images. Having the co-salient descriptors $R^A$ (block 302*a*) and $R^B$ (block 302*b*, as transposed), the only remaining thing is to decide whether they represent the same object or not. A cosine similarity matrix $S \in \mathbb{R}^{P \times Q}$ (cosine similarity matrix 304), between the two foreground synthesized descriptors is generated. The cosine similarity matrix S may be a paired representation with each feature of the filtered representation of the first feature map (e.g., $R^A$) being paired with a corresponding feature of the filtered representation of the second feature map (e.g., $R^B$). In other examples, instead of using cosine similarity, L1 and/or L2 distances may be used to determine the similarity between features of the feature maps 118*a*, 118*b*.

By leveraging the similarity information from matrix S the descriptors $R^A$ and $R^B$ are paired to generate the paired feature descriptors 306 as follows:

$$R^{A \cup B} = S \odot (R^A \times R^B)$$
$$= \{S_{ij} \cdot [R_i^A, R_j^B] \mid i = \overline{1 .. P}, j = \overline{1 .. Q}\}$$

where $R^{A \cup B} \in \mathbb{R}^{P \times Q \times 2d}$ and $\odot$ represent the Hadamard product.

In the current format, the information encoded in $R^{A \cup B}$ is different for every pair of images $I^A$ and $I^B$ as the segmented regions (as well as the dimensions of the segmentation masks) can be very different. To standardize its dimensionality for training purposes, an adaptive max pooling layer (ada pool) may be applied to bring the dimensionality of $R^{A \cup B}$ from $\mathbb{R}^{P \times Q \times 2d}$ to $\mathbb{R}^{K \times K \times 2d}$. In various examples other types of pooling may instead be used (e.g., mean pooling). The adaptive pooling operation may standardize the dimensionality of the inputs (since the inputs may be of different dimensions). Lastly, a CNN-based classification head 310

(Φ) is applied over the pooled set of features $\tilde{R}^{A \cup B}$, to provide the matching score 124 between images $I^A$ and $I^B$.

Returning to FIG. 1, the unstructured object matching system 100 is trained in an end-to-end fashion by propagating gradients through both coder 108 and matcher component 122. The unstructured object matching system 100 is penalized by a binary cross-entropy loss 128, $\mathcal{L}_{CE}$ on the predicted match score, $\tilde{S}$, and a cross-entropy image segmentation loss 126, $\mathcal{L}_{SEG}$ applied over the predicted segmentation masks, $\tilde{M}^A$ and $\tilde{M}^B$ (based on comparison with ground truth segmentation masks $M^A$, $M^B \in \mathbb{R}^{w \times h}$). FIG. 8 depicts an example algorithm that may be $\mathbb{R}$ used to train the unstructured object matching system of FIG. 1, in accordance with an example aspect of the present disclosure.

Figure 4A:
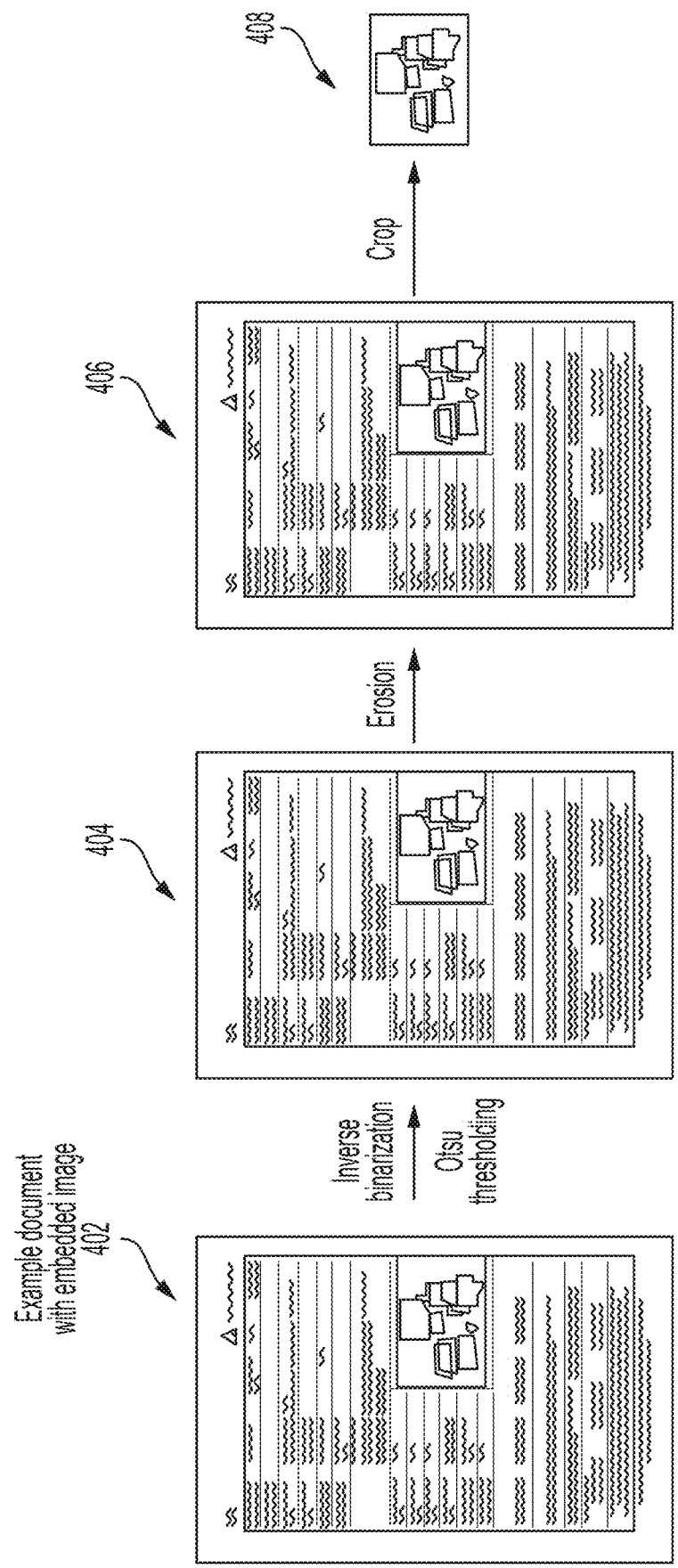
FIG. 4A depicts an example pre-processing technique that may be used to extract images from other documents, in accordance with various aspects of the present disclosure.

FIG. 4A depicts an example pre-processing technique that may be used to extract images from other documents, in accordance with various aspects of the present disclosure. In some examples, the unstructured object matching system 100 may be used to compare images that are extracted from a catalog (e.g., an online image catalog, an e-commerce site, etc.) with compliance documents. This may be useful to determine whether certain rules and regulations outlined in the compliance documents are applicable to a given item represented within the catalog. It should be appreciated that this is only one possible use of the unstructured object matching system 100. Generally, the unstructured object matching system 100 may be used to compare any two images to determine if there is one or more matching objects represented in the input images.

In the pre-processing techniques illustrated in FIG. 4A, there may be a set of document images (e.g., compliance document images) that include both text and images embedded within the text (e.g., example document with embedded image 402). The documents may be of various different file types (e.g., pdf, xls, doc, docs, etc.). The document images may be extracted by performing white background subtraction using inverse binarization and/or Otsu thresholding to generate a modified image 404. For example, a threshold pixel intensity value may be used to set pixels to a first binary pixel value or a second binary pixel value. For example, pixels with pixel intensity values above the threshold pixel intensity value may be set to a first binary pixel value (e.g., "white") and pixels with pixel intensity values below the threshold pixel intensity value may be set to a second binary pixel value (e.g., "black"). A mask of the foreground objects may be generated using boundary extraction using a morphological erosion operation to remove text elements and other small image artifacts to generate image 406. Finally, a cropping step may be used to separate the resulting non-image regions to generate the document image 408.

Figure 4B:
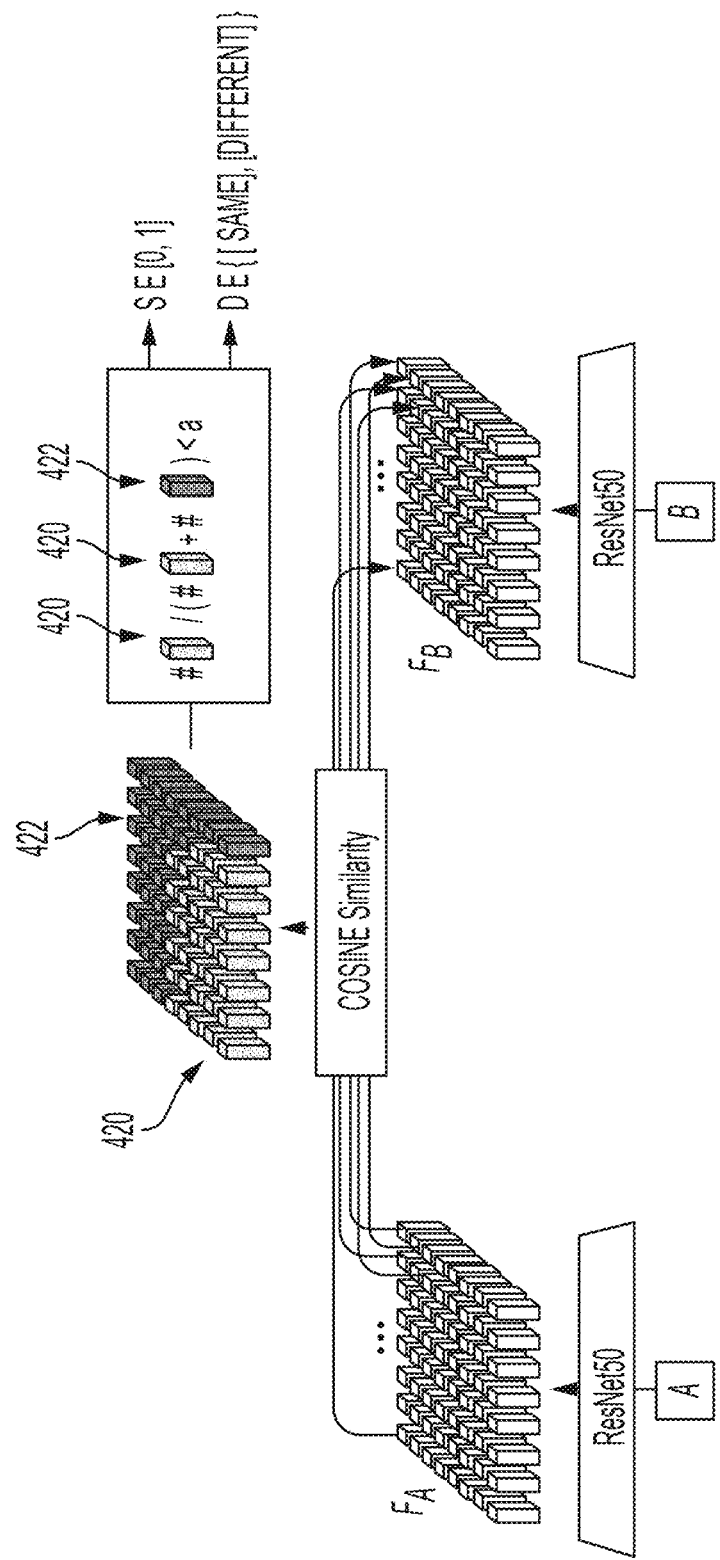
FIG. 4B depicts another example pre-processing technique that may be used to remove duplicate images from a dataset, in accordance with various aspects of the present disclosure.

FIG. 4B depicts another example pre-processing technique that may be used to determine duplicative image data and remove duplicate images from a dataset, in accordance with various aspects of the present disclosure. In some cases, an image dataset may include duplicate images. FIG. 4B depicts an example that may be used to remove duplicate images. In at least some examples, a cropping step may be performed prior to the techniques depicted in FIG. 4B. For example, cropping may be used to remove a background (e.g., a white background) from images prior to inputting the images into the encoder (e.g., ResNet 50 in FIG. 4B).

Given two images A, B$\in \mathbb{R}^{H \times W \times 3}$, two feature maps $F_A, F_B \in \mathbb{R}^{\frac{H}{32} \times \frac{W}{32} \times 256}$ may be generated using a CNN (e.g., ResNet 50 or some other desired encoder). Next, the percentage of features that are highly similar (determined using cosine distance, Euclidean distance, L2 distance, etc.) between the two feature maps $F_A$, $F_B$ may be determined as follows:

$$M(i, j) = \begin{cases} 0 & \text{(element 420)} \quad \text{cosine\_distance}(F_A(i, j), F_B(i, j)) < \lambda \\ 1 & \text{(element 422)} \quad \text{cosine\_distance}(F_A(i, j), F_B(i, j)) \geq \lambda \end{cases}$$

As shown in FIG. 4B, the similarity scores S may be used to determine a ratio between the number of features for which the score is 0 to the total number of features. If this ratio is less than α (a tunable parameter) the images are determined to be duplicate images. One copy of the duplicate images may be removed from the image data set. Conversely, if the ratio is ≥α, the images are determined to be different and both may be persisted in the image set.

Figure 5:
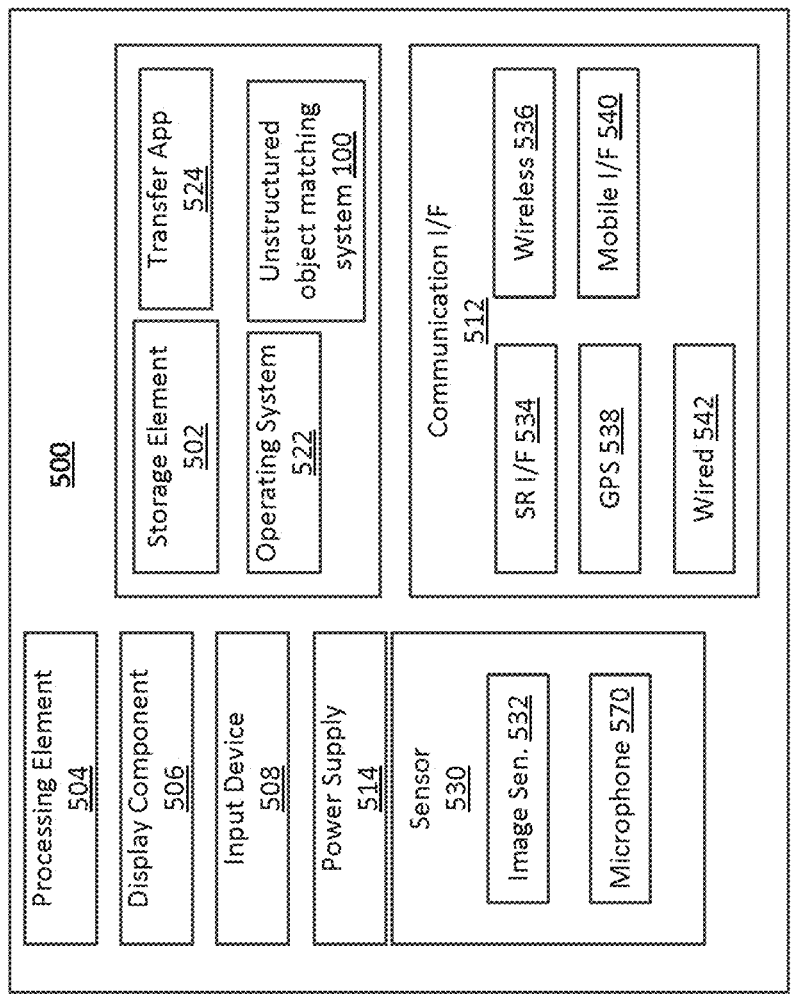
FIG. 5 depicts a block diagram showing an example architecture of a computing device that may be used in accordance with various embodiments described herein.

FIG. 5 is a block diagram showing an example architecture 500 of a computing device that may be used to perform unstructured object matching, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store one or more of the machine learning algorithms and/or their parameter sets described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

The unstructured object matching system 100 may be used by the architecture 500 to perform object matching for pairs of input images, as described herein. In various examples, the architecture 500 may include the coder 108 (including the various convolutional/pooling/activation blocks 202, 204, 206, 208, etc.). Additionally, in some examples, the architecture 500 may include the segmentation heads 114a, 114b, the components used to perform the feature masking operations 116a, 116b to generate filtered representations $R^A$ and $R^B$ of the respective feature maps 110a, 110b. Additionally, the architecture 500 may include the matcher component 122.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In various examples, the image sensor 532 may capture one or more of the images that are compared by unstructured object matching system 100.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
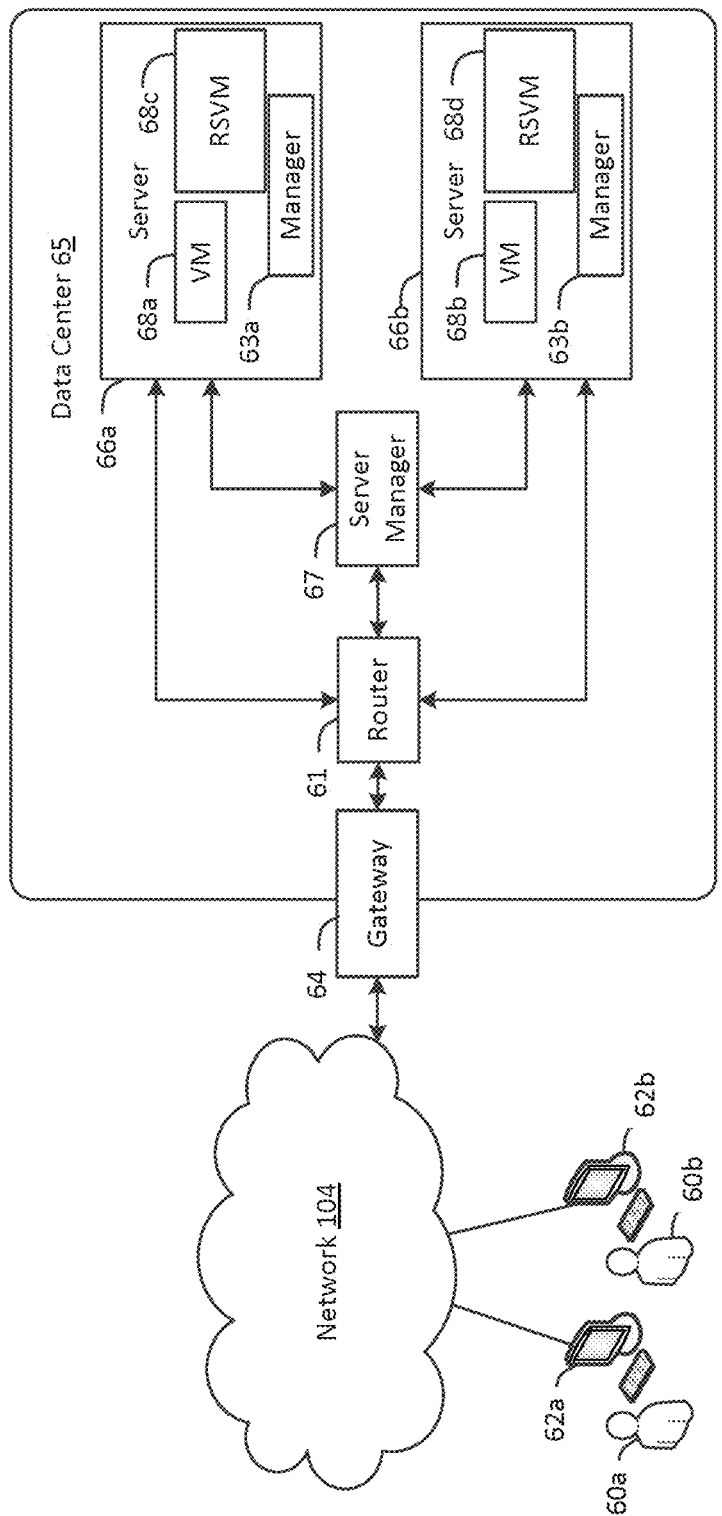
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide co-segmentation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various co-segmentation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols.

These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
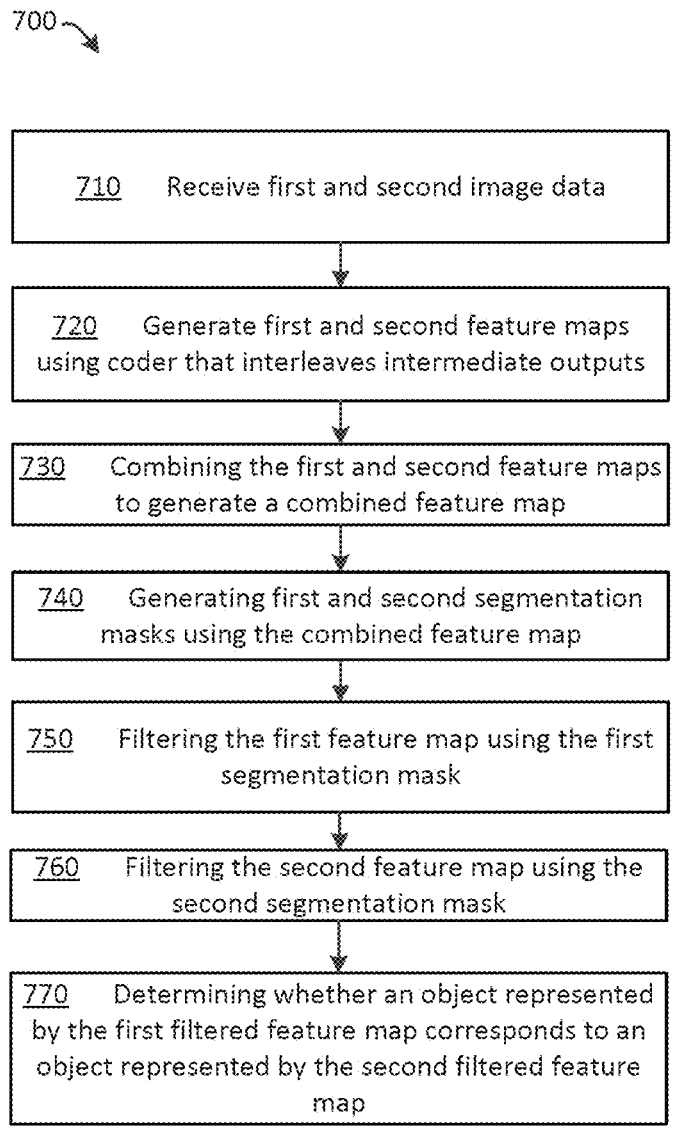
FIG. 7 includes a flowchart describing an example process that may be used for unstructured object matching in image data, in accordance with various aspects of the present disclosure.

FIG. 7 depicts a flow chart showing an example process 700 for unstructured object matching in image data, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which first and second image data may be received. The first and second image data may be frames of image data that are to be compared to determine if an object present in the first image or second image matches an object appearing in the other image. A frame of image data may comprise a two-dimensional grid of pixels (e.g., individually-addressable units of the image) with each pixel having a corresponding pixel value describing the intensity and/or color value of the pixel.

Processing may continue at action 720, at which first and second feature maps may be generated using coder 108 that interleaves intermediate outputs. For example, each block of the coder (including blocks 202a, 202b, 204a, 204b, 206a, 206b, etc.) may include a convolution layer (or layers), a pooling layer, and a ReLu (or other activation layer) to generate an output. As shown in FIG. 2, a first input image may be input into the initial block 202a of coder 108. Similarly, a second input image may be input into the block 202b of coder 108. The blocks 202a and 202b may share the same weights. However, the outputs from blocks 202a, 202b may be combined (e.g., concatenated) prior to input into the next blocks of the coder 108 (e.g., blocks 204a, 204b). In this way, the intermediate outputs of the coder 108 may be interleaved and the feature maps 110a, 110b represent the image features of both images.

Processing may continue at action 730, at which the first and second feature maps may be combined to generate a combined feature map. For example, feature maps 110a, 110b may be concatenated depth-wise to generate concatenated feature map information 112 as shown in FIG. 1. Combination of two-dimensional feature maps 110a, 110b may generate a three-dimensional feature map 112.

Processing may continue at action 740, at which first and second segmentation masks may be generated using the combined feature map. The segmentation heads $\sigma_A$ and $\sigma_B$ (e.g., segmentation heads 114a, 114b) output two segmentation masks $M^A \in \mathbb{R}^{w \times h}$ and $M^B \in \mathbb{R}^{w \times h}$ corresponding to input images $I^A$ and $I^B$, respectively. The segmentation masks contain foreground and background segmentation masks of the co-salient objects from both input images. The foreground information provided by ground truth masks $M^A$ and $M^B$ is used to train the segmentation heads 114a, 114b to mask the irrelevant (background) features from the feature maps 110a, 110b (e.g., $F^A$ and $F^B$), respectively, at feature masking operations 116a, 116b, to generate filtered representations $R^A$ and $R^B$ of the respective feature maps 110a, 110b. The filtered representations $R^A$ and $R^B$ of the feature maps are shown in FIG. 1 as filtered representations of feature maps 118a, 118b.

Processing may continue at action 750, at which the first feature map may be filtered using the first segmentation mask. For example, all features in the first feature map (e.g., feature map 110a) which correspond to spatial feature locations labeled as "background" in the co-salient segmentation mask output by segmentation head 114a may be filtered out, while all features that correspond to spatial feature locations labeled as "foreground" in the co-salient segmentation mask output by segmentation head 114a may be retained in filtered representations $R^A$. At action 760, filtered representation $R^B$ may be similarly generated using the segmentation mask output by segmentation head 114b to filter the feature map 110b.

Processing may continue at action 770, at which a determination may be made whether an object represented by the first filtered feature map $R^A$ corresponds to an object represented by the second filtered feature map $R^B$. In one example implementation, embeddings may be generated for the first and second filtered feature maps $R^A$ and $R^B$. The embeddings may be input into a neural network-based classifier trained to determine whether a matching object is present among the two images. In another example implementation, a matcher component 122 may determine if a matching object exists between the two images using a cosine similarity matrix that describes the cosine similarity of each corresponding pair of features between the two filtered feature maps $R^A$ and $R^B$. A CNN-based classifier is applied over the pooled set of features $\tilde{R}^{A \cup B}$, to provide the matching score 124 between the two input images (e.g., images $I^A$ and $I^B$).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of matching different depictions of objects in image data, the method comprising:
   receiving first image data comprising a first representation of an object;
   receiving second image data comprising a second representation of the object, wherein the second representation of the object includes a different view of the object in the second image data relative to the first image data;
   processing, by an encoder network, the first image data and the second image data by interleaving signals from the first image data and the second image data to generate a first feature map representing the first image data and a second feature map representing the second image data;
   concatenating the first feature map and the second feature map to generate a combined feature map, wherein the combined feature map spatially overlaps common features from the first feature map and the second feature map;
   computing a set of correlation scores for the combined feature map;
   determining, using the set of correlation scores, a co-salient region of the combined feature map;
   generating, by inputting the combined feature map into a first segmentation head, a first segmentation mask representing foreground image data for the co-salient region detected in the first image data;
   generating, by inputting the combined feature map into a second segmentation head, a second segmentation mask representing foreground image data for the co-salient region detected in the second image data;
   filtering the first feature map using the first segmentation mask to generate first data comprising the first representation of the object as represented in the first feature map;
   filtering the second feature map using the second segmentation mask to generate second data comprising the second representation of the object as represented in the second feature map;
   comparing the first data and the second data using a cosine similarity metric to generate a similarity matrix; and
   determining, using a first convolutional neural network and the similarity matrix, that the object represented in the first image data matches the object represented in the second image data.

2. The method of claim 1, further comprising:
   receiving third image data comprising a third representation of the object;
   generating, using a second convolutional neural network, a third feature map representing the third image data and a fourth feature map representing the first image data, wherein the third feature map and the fourth feature map each comprise a first number of features;
   determining a cosine distance between a first feature of the third feature map and a corresponding feature of the fourth feature map;
   determining that the cosine distance is less than a threshold; and
   determining that the third image data is duplicative of the first image data based at least in part on the cosine distance.

3. The method of claim 1, further comprising:
   receiving third image data comprising text and the first image data;
   determining a threshold pixel intensity value;
   determining first pixels of the third image data having an intensity value above the threshold pixel intensity value;
   setting the first pixels to a first binary pixel value;
   determining second pixels of the third image data having an intensity value below the threshold pixel intensity value;
   setting the second pixels to a second binary pixel value;
   generating a mask using boundary extraction on the first image data, the boundary extraction using a morphological erosion operation; and
   separating the first image data from the text using the mask.

4. A method comprising:
   receiving first image data;
   receiving second image data;
   generating a first feature map representing the first image data;
   generating a second feature map representing the second image data;
   combining the first feature map and the second feature map into a combined feature map;
   computing a set of correlation scores for the combined feature map;

determining, using the set of correlation scores, a first region of the combined feature map;
generating a first segmentation mask using the combined feature map and the first region;
generating a second segmentation mask using the combined feature map and the first region;
applying the first segmentation mask to the first feature map to generate a filtered representation of the first feature map;
applying the second segmentation mask to the second feature map to generate a filtered representation of the second feature map; and
determining that a first object depicted in the first image data corresponds to a second object depicted in the second image data using the filtered representation of the first feature map and the filtered representation of the second feature map.

5. The method of claim 4, further comprising:
inputting the first image data into a first encoder block comprising at least one first convolutional layer and at least one pooling layer;
outputting by the first encoder block a first intermediate representation of the first image data;
inputting the second image data into a second encoder block comprising at least one second convolutional layer and at least one pooling layer; and
outputting by the second encoder block a second intermediate representation of the second image data.

6. The method of claim 5, further comprising:
combining the first intermediate representation and the second intermediate representation into a first combined feature representation;
inputting the first combined feature representation into a third encoder block comprising at least one third convolutional layer and at least one pooling layer;
outputting, by the third encoder block, a third intermediate representation of the first image data;
inputting the first combined feature representation into a fourth encoder block comprising at least one fourth convolutional layer and at least one pooling layer; and
outputting, by the fourth encoder block, a fourth intermediate representation of the second image data.

7. The method of claim 6, further comprising:
combining the third intermediate representation of the first image data and the fourth intermediate representation of the second image data to generate a second combined feature representation;
generating the first feature map based at least in part on the second combined feature representation; and
generating the second feature map based at least in part on the second combined feature representation.

8. The method of claim 4, further comprising:
determining a cosine similarity matrix describing a similarity between the filtered representation of the first feature map and the filtered representation of the second feature map; and
generating a paired representation by pairing each feature of a first set of features of the filtered representation of the first feature map with a respective feature of the filtered representation of the second feature map using the cosine similarity matrix.

9. The method of claim 8, further comprising determining, by inputting the paired representation into a convolutional neural network, that the first object depicted in the first image data corresponds to the second object depicted in the second image data.

10. The method of claim 4, wherein the first feature map and the second feature map are two dimensional feature maps of the same dimensions, and wherein the combining the first feature map and the second feature map into the combined feature map along a third dimension such that the combined feature map is a three dimensional feature map.

11. The method of claim 4, further comprising:
receiving third image data comprising a third representation of the first object;
generating, using a convolutional neural network, a third feature map representing the third image data and a fourth feature map representing the first image data, wherein the third feature map and the fourth feature map each comprise a first number of features;
determining a distance between a first feature of the third feature map and a corresponding feature of the fourth feature map;
determining that the distance is less than a threshold; and
determining that the third image data is duplicative of the first image data based at least in part on the distance.

12. The method of claim 4, further comprising:
generating the first segmentation mask using a first segmentation head and the first region; and
generating the second segmentation mask using a second segmentation head and the first region, wherein the first segmentation head and the second segmentation head are trained separately with respect to one another.

13. The method of claim 4, further comprising:
generating the first feature map and the second feature map using an encoder, the encoder comprising a plurality of encoder blocks, wherein each encoder block of the plurality of encoder blocks comprises a convolutional neural network, a pooling component, and an activation function, wherein a first output of each encoder block for the first image data is combined with a second output of each encoder block for the second image data prior to input into a subsequent encoder block of the encoder.

14. A system comprising:
at least one processor; and
a non-transitory computer-readable memory storing instructions that, when executed by the at least one processor, are effective to:
receive first image data;
receive second image data;
generate a first feature map representing the first image data;
generate a second feature map representing the second image data;
combine the first feature map and the second feature map into a combined feature map;
computing a set of correlation scores for the combined feature map;
determining, using the set of correlation scores, a first region of the combined feature map;
generate a first segmentation mask using the combined feature map and the first region;
generate a second segmentation mask using the combined feature map and the first region;
apply the first segmentation mask to the first feature map to generate a filtered representation of the first feature map;
apply the second segmentation mask to the second feature map to generate a filtered representation of the second feature map; and
determine that a first object depicted in the first image data corresponds to a second object depicted in the second image data using the filtered representation of the first feature map and the filtered representation of the second feature map.

15. The system of claim 14, the non-transitory computer-readable memory storing further instructions that, when executed by the at least one processor, are further effective to:
input the first image data into a first encoder block comprising at least one first convolutional layer and at least one pooling layer;
output by the first encoder block a first intermediate representation of the first image data;
input the second image data into a second encoder block comprising at least one second convolutional layer and at least one pooling layer; and
output by the second encoder block a second intermediate representation of the second image data.

16. The system of claim 15, the non-transitory computer-readable memory storing further instructions that, when executed by the at least one processor, are further effective to:
combine the first intermediate representation and the second intermediate representation into a first combined feature representation;
input the first combined feature representation into a third encoder block comprising at least one third convolutional layer and at least one pooling layer;
output, by the third encoder block, a third intermediate representation of the first image data;
input the first combined feature representation into a fourth encoder block comprising at least one fourth convolutional layer and at least one pooling layer; and
outputting, by the fourth encoder block, a fourth intermediate representation of the second image data.

17. The system of claim 16, the non-transitory computer-readable memory storing further instructions that, when executed by the at least one processor, are further effective to:
combine the third intermediate representation of the first image data and the fourth intermediate representation of the second image data to generate a second combined feature representation;
generate the first feature map based at least in part on the second combined feature representation; and
generate the second feature map based at least in part on the second combined feature representation.

18. The system of claim 14, the non-transitory computer-readable memory storing further instructions that, when executed by the at least one processor, are further effective to:
determine a cosine similarity matrix describing a similarity between the filtered representation of the first feature map and the filtered representation of the second feature map; and
generate a paired representation by pairing each feature of a first set of features of the filtered representation of the first feature map with a respective feature of the filtered representation of the second feature map using the cosine similarity matrix.

19. The system of claim 18, the non-transitory computer-readable memory storing further instructions that, when executed by the at least one processor, are further effective to:
determine, by inputting the paired representation into a convolutional neural network, that the first object depicted in the first image data corresponds to the second object depicted in the second image data.

20. The system of claim 14, wherein the first feature map and the second feature map are two dimensional feature maps of the same dimensions, and wherein the combining the first feature map and the second feature map into the combined feature map along a third dimension such that the combined feature map is a three dimensional feature map.

* * * * *